Figure 1:
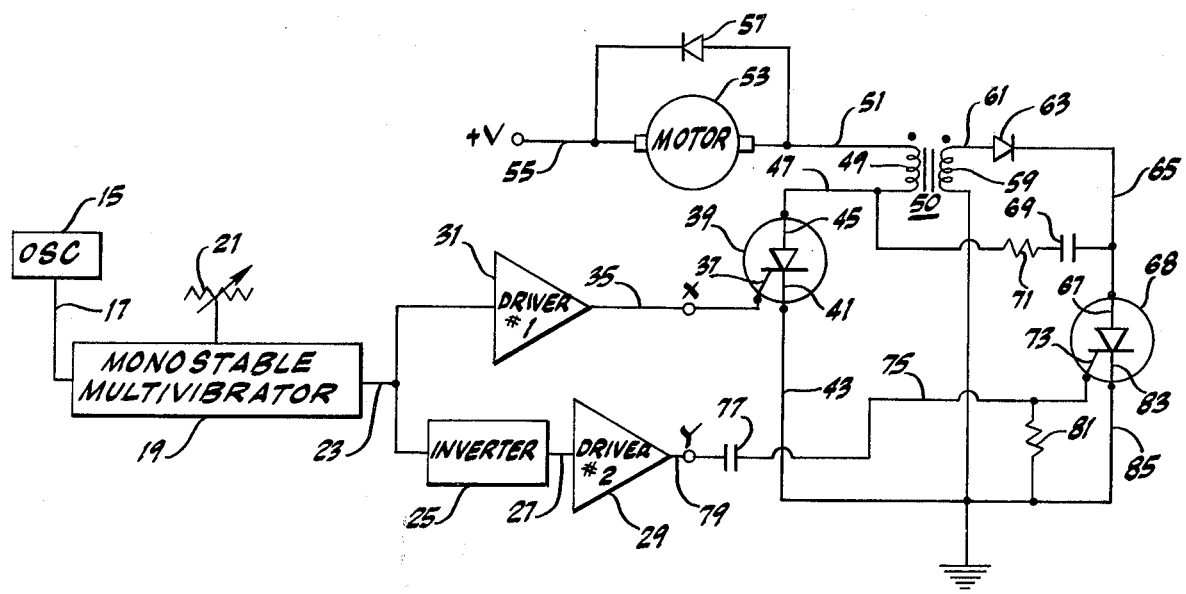

United States Patent [19]
Barton

[11] 3,875,486
[45] Apr. 1, 1975

[54] MOTOR SPEED CONTROL CIRCUIT

[76] Inventor: William J. Barton, 5949 Turnergrove, Lakewood, Calif.

[22] Filed: Oct. 12, 1973

[21] Appl. No.: 405,818

[52] U.S. Cl.............. 318/341, 318/345, 321/45 C
[51] Int. Cl. ............................................ H02p 5/06
[58] Field of Search .......... 318/341, 138, 139, 345, 318/375; 321/45 C

[56] References Cited
UNITED STATES PATENTS

| | | | |
|---|---|---|---|
| 3,660,738 | 5/1972 | Anderson | 321/45 C |
| 3,663,942 | 5/1972 | Jakobsen | 321/45 C |
| 3,667,021 | 5/1972 | Anderson | 321/45 C |
| 3,784,880 | 1/1974 | Stakhno | 321/45 C |

Primary Examiner—Robert K. Schaefer
Assistant Examiner—John J. Feldhaus
Attorney, Agent, or Firm—Raymond L. Madsen

[57] ABSTRACT

There is disclosed a switching circuit for transforming a source of DC voltage into a pulsating voltage of constant frequency and variable pulse duration including a load connected in series with the primary of a transformer which in turn is connected through a first controllable rectifier to a common circuit ground. The gate electrode of the first controllable rectifier is connected to a source of constant frequency pulses of variable duration. The secondary winding of the transformer is connected from the common circuit ground in series with a diode, the cathode of which is connected to the anode of a second controllable rectifier, the cathode of the second controllable rectifier being connected to the common circuit ground. The gate of the second controllable rectifier is capacitively coupled to a source of pulses which are the exact complement to the pulses applied to the gate of the first controllable rectifier. The gate of the second controllable rectifier is resistively connected to the cathode thereof. The anodes of the controllable rectifiers are further connected by the series of combination of a resistor and a capacitor. A constant frequency oscillator triggers a monostable multivibrator with a potentiometer adjustment to provide a pulse of variable duration which is connected through a driver to the gate of a first controllable rectifier. An inverting circuit and driver provide the inverted pulses to the capacitor connected to the gate of the second controllable rectifier.

5 Claims, 2 Drawing Figures

MOTOR SPEED CONTROL CIRCUIT

The present invention relates to a DC (direct current) chopper circuits for transforming the voltage of a DC (direct current) source of power into a pulsating voltage of constant frequency and varying pulse duration and more particularly to a speed control circuit for DC motors.

In the field of DC motor speed regulation, it has been the general practice to employ circuits of the type called "Jones choppers" to transform the voltage of a DC voltage source into a pulsating voltage which is supplied to a load such as a DC motor that is series-connected with the DC voltage source and a controllable rectifier having an associated first timing device for determining the moments of ignition of the rectifier, the circuit arrangement comprising a commutation capacitor which, via a current transformer and a rectifier, is charged by the leading edges of the pulsating load current and the charge of which is supplied via a controllable switch, the closing of which is controlled by a second timing device, to the controllable rectifier for extinguishing the same.

The controllable rectifier and the controllable switch will normally be a thyristor or a silicon control rectifier which, as is well known, has the characteristic that it is impossible to extinguish it by means of a signal applied to the control or gate electrode, but that extinction requires the current passing through the controllable rectifier being essentially brought down to zero value. The two timing devices supply a signal for the ignition of a controllable rectifier and the switching of the controllable switch, respectively.

In a known circuit arrangement of the type dealt with, the voltage across the load is used as a control voltage for the second timing device. The period of time determined by the second timing device and which determines the width of the pulse, always begins at the moment at which the load current starts. It is possible, in a similar manner, to utilize the voltage across the controllable rectifier as a function control voltage for the first timing device.

In another known circuit arrangement, the functioning of the second timing device is controlled by the voltage across the commutation capacitor which voltage will always be present even in the case of a short circuit and therefore ensures that the second timing device will also function under short circuit conditions.

Although such circuit arrangements have served the purpose, they have not proved entirely satisfactory under all conditions of service for the reason that considerable difficulty has been experienced in obtaining a pulse of variable width or duration to the load which can be adjusted from substantially zero duration to substantially a full "on" condition.

Those concerned with the development of adjustable speed DC motors have long recognized the need for a simple control circuit having a minimum of components and a wide range of pulse duration control. The present invention fulfills this need.

One of the most cirtical problems confronting designers of DC motor speed control circuits has been the elimination of transformer coupling in timing control circuits. In the field of controllable rectifier DC choppers, it has been the general practice to employ tapped inductors or auto transformers to charge the commutating capacitor with enough energy to turn off the controllable rectifier in series with the source of DC voltage and the load. The amount of energy stored in the commutating capacitor increases as the load current increases due to the auto-transformer action. Because of the auto-transformer, it is necessary to use transformer coupling to the control gates of the controllable rectifiers when a common circuit ground is utilized. The present invention overcomes this problem by utilizing a transformer having separate primary and secondary windings thereby enabling a common circuit ground and the elimination of transformer coupling of the timing pulses to the control gates of the controllable rectifiers.

In addition, it has been the general practice to employ a plurality of intercoupled timing circuits resulting in a complex circuit and a multiplicity of parts and devices. The present invention avoids this complexity and reduces the number of parts and devices by utilizing a unique single timing circuit that generates complementary pulses of variable width or duration.

The general purpose of this invention is to provide a controllable rectifier switching circuit with a widely adjustable pulse timing circuit which embraces all the advantages of similarly employed circuits for supplying direct current pulses to a load and possesses none of the aforedescribed disadvantages. To attain this, the present invention contemplates a unique transformer arrangement in the switching circuit and a single timing circuit having complementary outputs of which one is coupled to the control grid of one switch and the other is capacitively coupled to the control gate of the extinguishing switch whereby a pulsating voltage is applied to the load with pulse durations adjustable from substantially zero duration to substantially full "on" duration.

An object of the present invention is the provision of a controllable rectifier switching circuit for transforming the voltage of a source of DC power into a pulsating voltage having a widely adjustable pulse duration under the control of a single timing circuit having complementary outputs.

Another object is to provide a controllable rectifier DC chopper circuit having a single transformer and a single common circuit ground whereby the direct output and the inverted output of a single timing circuit can be directly coupled and capacitively coupled to the control gates of the controllable rectifiers in the chopper circuit.

A further object of the invention is the provision of a controllable rectifier DC chopper circuit having a transformer of separate and unconnected primary and secondary windings and wherein the controllable rectifiers are controlled by a single oscillator and monostable multivibrator circuit combination.

Still another object is to provide a DC chopper motor speed control circuit which is controlled by the adjustable pulse duration of the complementary outputs of a monostable multivibrator triggered by a constant frequency oscillator to provide a voltage pulse of adjustable duration to a load.

Figure 2:
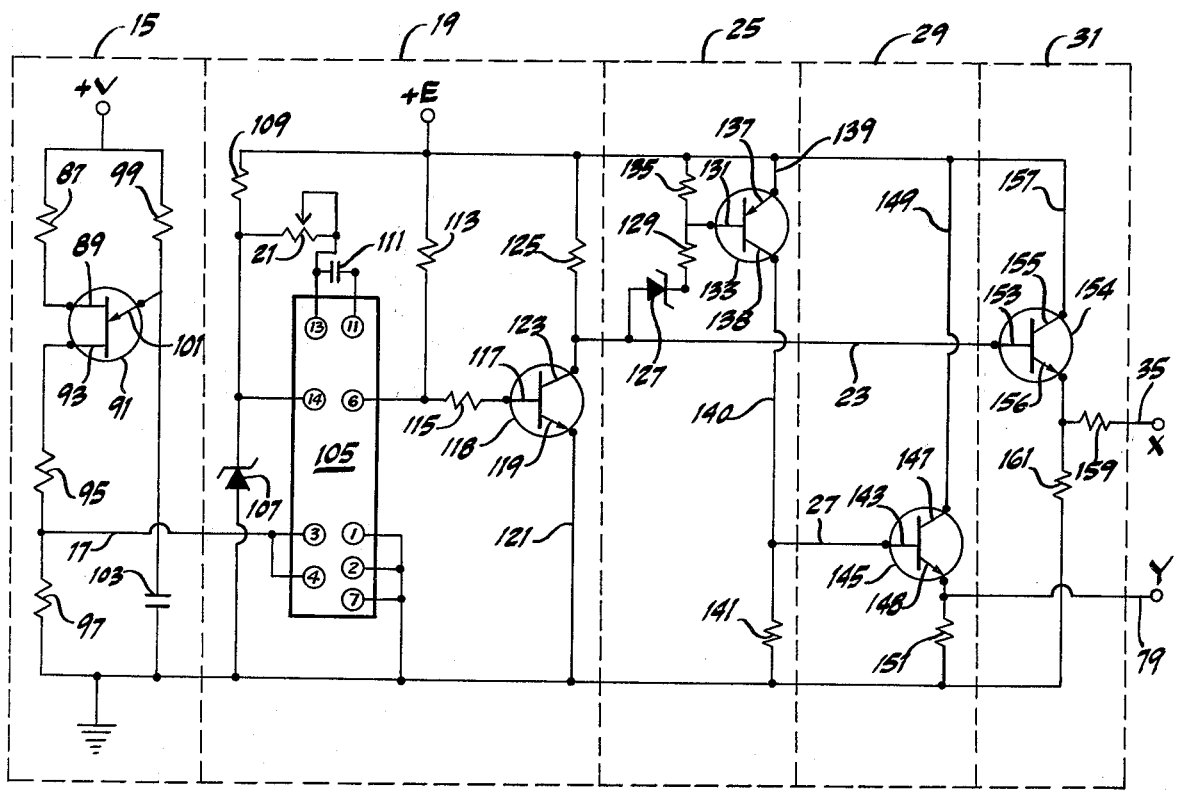

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates a circuit diagram of a preferred embodiment of the present invention partially in block form; and FIG. 2 illustrates a schematic diagram of the block diagram portions of the circuit of FIG. 1.

Referring now to the drawings, wherein like reference characters designate like or corresponding parts throughout the several drawings, there is shown in FIG. 1 (which illustrates a preferred embodiment) a constant frequency oscillator 15 connected by line 17 to a monostable multivibrator 19 having an adjustable resistance 21 connected thereto to control the pulse duration of the constant frequency pulse at output line 23. Monostable multivibrator 19 is further connected by line 23 to inverter 25 which in turn is connected by line 27 to driver 29, further identified as driver number 2. Line 23 is further connected to driver 31 further designated as driver number 1 which in turn is connected by line 35, also designated as terminal X, to control gate 37 of controllable rectifier 39. Controllable rectifier 39 has cathode 41 thereof connected by line 43 to a common circuit ground. Anode 45 of controllable rectifier 39 is connected by line 47 to one side of primary winding 49 of transformer 50. The other side of primary winding 49 is connected by line 51 to one terminal of motor 53. The other terminal of motor 53 is connected by line 55 to a positive source of DC power designated as +V. Diode 57 is connected across motor 53 having the anode thereof connected to line 51 and the cathode to line 55. Secondary winding 59 of transformer 50 has one side thereof connected to the common circuit ground and the other side thereof connected to line 61 which in turn is connected to the anode of diode 63. The cathode of diode 63 is connected by line 65 to anode 67 of controllable rectifier 68. Capacitor 69 is connected from line 65 to one end of resistor 71, the other end of resistor 71 being connected to line 47. Control gate 73 of controllable rectifier 68 is connected by line 75 to one end of capacitor 77, the other end of capacitor 77 being connected to line 79 which is the output of driver number 2 and also designated as terminal Y. Resistor 81 is connected between control gate 73 and the common circuit ground. Cathode 83 of controllable rectifier 68 is connected by line 85 to the common circuit ground.

Turning now to FIG. 2, there is illustrated a circuit diagram containing the components within the block portions of FIG. 1. Within the dashed line portion corresponding to constant frequency oscillator 15 of FIG. 1, resistor 87 is connected from the source of positive DC voltage designated as +V to base 89 of unijunction transistor 91. Base 93 of unijunction transistor is further connected through resistor 95 in series with resistor 97 to the common circuit ground. Resistor 99 is connected from +V to emitter 101 of unijunction transistor 91 and is further connected to one end of capacitor 103, the other end of which is connected to the common circuit ground. The junction of resistors 95 and 97 is connected by line 17 to terminals 3 and 4 of integrated circuit 105 within the dashed line corresponding to monostable multivibrator 19 of FIG. 1. Terminal 14 of integrated circuit 105 is connected to the cathode end of Zener diode 107 which in turn has the anode and thereof connected to the common circuit ground. The cathode of Zener diode 107 is further connected through resistor 109 to a source of positive DC voltage +E. Variable resistor 21 is connected between the junction of resistor 109 and Zener diode 107 and terminal 13 of integrated circuit 105. Capacitor 111 is connected between terminals 11 and 13 of integrated circuit 105. Terminals 1, 2 and 7 of integrated circuit 105 are connected together and to the common circuit ground. The output of integrated circuit 105 is terminal 6 and is connected through resistor 113 to +E, and is further connected through resistor 115 to base 117 of NPN transistor 118. Emitter 119 of transistor 118 is connected by line 121 to the circuit ground. Collector 123 of transistor 118 is connected through resistor 125 to +E. Line 23 connects collector 123 to the anode of Zener diode 127 which is part of the circuitry included within the dashed line corresponding to inverter 25 of FIG. 1. The cathode of Zener diode 127 is further connected through resistor 129 to base 131 of transistor 133 which in turn is connected through resistor 135 to +E. Emitter 137 of NPN transistor 133 is connected by line 139 to +E. Collector 138 of transistor 133 is connected by line 140 to one end of resistor 141, the other end of resistor 141 being connected to the common circuit ground. Line 140 is further connected by line 27 to base 143 of NPN transistor 145 which is part of the circuitry included within the dashed lines corresponding to driver 29 of FIG. 1. Collector 147 of transistor 145 is connected by line 149 to +E. Emitter 148 of transistor 145 is connected to line 79, also designated as terminal Y, and to one end of resistor 151, the other end of resistor 151 being connected to the common circuit ground. Line 79 is further designated as terminal Y. Base 153 of NPN transistor 154 is connected to line 23, transistor 154 being part of the circuitry included within the dashed lines designated as driver 31 of FIG. 1. Collector 155 of NPN transistor 154 is connected by line 157 to +E. Emitter 156 of NPN transistor 154 is connected to junction of resistors 159 and 161, the other end of resistor 161 being connected to the common circuit ground and the other end of resistor 159 being connected to line 35, also designated as terminal X.

Operation of the switching or DC chopper circuit can best be described by reference to FIG. 1. The periodic output signal of constant frequency oscillator 15 triggers monostable multivibrator 19 to produce a pulse of varying width at line 23, the width of the pulse being controlled from substantially zero width to approximately 95 percent of the period of the constant frequency by variable resistor 21 in a conventional manner well known to the electronic circuit designer. Driver 31 provides a low impedance output to control gate 37 of controllable rectifier 39. The pulse output of the monostable multivibrator is positive with reference to the common circuit ground as is also the pulse at the output of driver 31. The positive pulse at control gate 37 turns "on" controllable rectifier 39 and causes it to become conductive in a low impedance state. Therefore, a load current flows from +V through motor 53 and primary winding 49 of transformer 50 and through conducting controllable rectifier 39 to the common circuit ground. During this condition motor 53 is activated and the load current therethrough also flows through primary winding 49. The number of turns of secondary winding 59 is substantially greater than the number of turns of primary winding 49 such that the load current induces a current in secondary winding 59 and a voltage thereacross to forward bias diode 63 and to charge commutating capacitor 69 through resistor 71 and conducting controllable rectifier 39 with an amount of energy that increases as the load current increases in motor 53. Capacitor 69 must store enough energy to turn off controllable rectifier 39 when controllable rectifier 68 is turned on. The size of capacitor 69 and the turns ratio transformer 50 are selected to meet this requirement.

All during the time of conduction of controllable rectifier 39, controllable rectifier 68 is maintained off by resistor 81 connected between control gate 73 and the common circuit ground. When the output pulse from the monostable multivibrator drops back to substantially zero at line 23, inverter 25 produces a positive going pulse at line 27 which in turn appears at line 79 at the output of driver 29 to produce a positive going pulse at terminal Y. This pulse is capacitively coupled through capacitor 77 to control gate 73 of controllable rectifier 68, turning "on" controllable rectifier 68 and causing it to conduct in a low impedance state. Commutating capacitor 69, which has been charged up to a positive voltage between line 65 and resistor 71 can now discharge through conducting controllable rectifier 68, the discharge current being limited by resistor 71. To turn "off" controllable rectifier 39, the initial discharge current of capacitor 69 must be larger than the load current such that the current through controllable rectifier 39 is reduced to zero and the voltage thereacross reversed by the voltage across capacitor 69. Capacitor 69 then charges in the reverse direction through primary winding 49 in series with motor 53 and conducting controllable rectifier 68. Under this circuit condition capacitor 69 charges toward +V, such that if allowed to complete its charging, the terminal of capacitor 69 connected to resistor 71 will be +V volts with respect to the capacitor terminal connected to line 65.

Coupling capacitor 77 is chosen to differentiate the leading edge of the positive pulse applied thereto to turn on controllable rectifier 68 such that only the differentiated leading edge is applied to control gate 73 as a voltage spike to turn on controllable rectifier 68. This enables a short "on" period for controllable rectifier 68 in the event a large pulse width is being generated by monostable multivibrator 19 whereby controllable rectifier 39 is only "off" for a short period of time. During the time of reverse charging of commutating capacitor 69 through conducting controllable rectifier 68, the secondary winding 59 of transformer 50 is attempting to conduct current therethrough in the direction to reverse bias diode 63, thereby preventing any current flow in secondary winding 59 which would reduce the current through controllable rectifier 68 and possibly cause premature turn "off".

During the interval of conduction of controllable rectifier 68 no power is delivered to motor 53, motor 53 is coasting or "free wheeling". It is possible during this interval that the motor can generate voltages across its terminal which could cause the voltage at line 51 to exceed +V volts. Diode 57 connected across the motor in the direction illustrated clamps line 51 to +V and prevents the voltage of line 51 from exceeding +V.

When the next pulse appears at the output of the monostable multivibrator 19, controllable rectifier 39 is again turned on causing commutating capacitor 69 to discharge through resistor 71 and conducting controllable rectifier 39 thereby reducing the current to zero in controllable rectifier 68 and applying a reverse voltage thereacross to turn off controllable rectifier 68. Commutating capacitor 69 is then charged through diode 63 from secondary winding 59 in the manner as described hereinabove and the process repeats itself. During duration of the "on" time of controllable rectifier 39 as controlled by the time duration of the pulse applied to control gate 37 motor 53 too increases in speed. When controllable rectifier 68 is "on" and 39 is "off", no power is delivered to the motor and the motor speed decreases. Therefore, the duration of the constant frequency pulses of the pulsating power controls the motor speed.

Operation of the timing and pulse generating circuits is best described by reference to FIG. 2. Oscillator 59 is a constant frequency unijunction oscillator, the frequency of which is determined by resistor 99 and capacitor 103. As capacitor 103 charges through resistor 99, the unijunction transistor 101 "fires" or becomes conductive and discharges capacitor 103 through resistors 95 and 97. The discharge pulse appears at the juncture between resistor 95 and 97, the resistors acting as a voltage divider circuit to apply the proper magnitude of pulse to terminals 3 and 4 of integrated circuit 105. Integrated circuit 105 is typically a Fairchild 9601 integrated circuit. Zener diode 107 provides the proper bias voltage to terminal 14 of integrated circuit 105. The duration of the pulse produced by the multivibrator circuit is controlled by variable resistor 21 and resistor 109 and capacitor 111, the greater the resistance value of variable resistor 21, the longer the duration of the pulse output at terminal 6. Transistor 118 converts the low pulse voltage output at terminal 6 from integrated circuit 105 to a large pulse amplitude at line 23. Transistor 133 inverts the pulse on line 23 and applies it to driver transistor 145, to provide the inverted or complementary pulse output to terminal Y. Pulse on line 23 is further directly connected to driver transistor 154 to provide the pulse output to terminal X. Both driver transistors 145 and 154 are of the emitter follower type to provide a low impedance output for driving the control gates of controllable rectifiers 39 and 68, respectively. The components for the controllable rectifier chopper circuit are selected for the current ratings desired.

It now should be apparent that the present invention provides a controllable rectifier circuit arrangement which may be employed in conjunction with a motor to which a varying power is desired to be supplied which circuit is characterized by a common circuit ground, a single transformer, and a single timing circuit to produce constant frequency pulsating power of a pulse duration having a variable duty cycle of substantially 95%.

Although particular components, etc., have been discussed in connection with a specific embodiment of an analyzer constructed in accordance with the teachings of the present invention, others may be utilized. Furthermore, it will be understood that although an exemplary embodiment of the present invention has been disclosed and discussed, other applications and circuit arrangements are possible and that the embodiments disclosed may be subjected to various changes, modifications, and substitutions without necessarily departing from the spirit of the invention.

We claim:

1. A switching circuit responsive to two complementary constant frequency pulses of variable duration for the controlled application of DC power through a DC motor load, comprising:
- a transformer having a primary and a secondary winding, said primary winding having one end thereof for connection through a DC motor load to a positive source of direct current power, one end of said secondary winding being connected to a common circuit ground, the polarity of said secondary winding being selected such that a current is conducted from said one end of said secondary winding in response to a current entering said one end of said primary winding;
- a first controlled rectifier having an annode, a cathode, and a gate electrode, said annode being connected to the other end of said primary winding, said cathode being connected to said common circuit ground, said gate electrode and said common ground being adapted to be connected to a source of one of the two complementary constant frequency pulses of variable duration;
- a diode having an annode and a cathode, said annode being connected to the other end of said secondary winding;
- a second controllable rectifier having an annode, cathode, and a gate electrode, said cathode being connected to said common circuit ground, said annode being connected to the cathode of said diode;
- a resistor connected between said gate electrode and said cathode of said second controllable rectifier;
- a first capacitor having one end thereof connected to said gate electrode of said second controllable rectifier, the other end of said capacitor and said common ground being adapted to be connected to a source of the other of said two complementary constant frequency pulses of variable duration;
- a second resistor having one end thereof connected to the annode of said first controllable rectifier; and
- a second capacitor connected between the other end of said second resistor and the annode electrode of said second controllable rectifier.

2. The switching circuit described in claim 1 further including:
- an oscillator for providing a constant frequency periodic signal;
- a monostable multivibrator having an input and output, said input being connected to said oscillator, said constant frequency periodic signal of said oscillator triggering said monostable multivibrator to produce a constant frequency pulse at said output, said monostable multivibrator having a variable resistor to control the duration of said constant frequency pulse;
- driver means having an input connected to said monostable multivibrator output, said driving means having an output connected between said common ground and said gate electrode of said first controllable rectifier whereby the constant frequency pulse of controllable duration from said monostable multivibrator is said source of one of two complementary constant frequency pulses of variable duration which is applied between said common ground and said gate electrode of said first controllable rectifier to render said first controllable rectifier conductive which in turn renders said second controllable rectifier non-conductive if said second controllable rectifier was in a conductive state; and
- inverter and driver means connected between said multivibrator output and said other end of said first capacitor for inverting the monostable multivibrator output and said other end of said first capacitor for inverting the monostable multivibrator pulse output and applying it between said common ground and said first capacitor and through said first capacitor to the gate electrode of said second controllable rectifier whereby the constant frequency pulse of controllable duration from said inverter and driver means is said source of the other of two complementary constant frequency pulses of variable duration which renders said second controllable rectifier conductive and in turn renders said first controllable rectifier non-conductive if said first controllable rectifier was in a conductive state.

3. The switching circuit described in claim 2 wherein said oscillator is a constant frequency unijunction transistor oscillator circuit.

4. The switching circuit described in claim 3 wherein said monostable multivibrator is an integrated circuit.

5. The switching circuit described in claim 4 further including:
- a direct current motor load connected between said one end of said primary winding and the positive source of direct current power; and
- a diode having an anode and a cathode electrode, said anode electrode being connected to said one end of said primary winding and said cathode electrode being connected to the positive side of a source of DC power to which said motor is connected whereby said diode provides a short circuit to voltages and currents generated by said motor load when power is removed therefrom by said first controllable rectifier being rendered non-conductive.

* * * * *